(12) United States Patent
Ogawa et al.

(10) Patent No.: US 12,115,607 B2
(45) Date of Patent: Oct. 15, 2024

(54) RETAINER GRIPPING DEVICE

(71) Applicants: TOYOTA JIDOSHA KABUSHIKI KAISHA, Aichi-ken (JP); SHINMEI INDUSTRY CO., LTD., Aichi (JP)

(72) Inventors: Ryoichi Ogawa, Seto (JP); Yasuhiro Kawai, Toyota (JP)

(73) Assignees: TOYOTA JIDOSHA KABUSHIKI KAISHA, Aichi-Ken (JP); SHINMEI INDUSTRY CO., LTD., Aichi (JP)

( * ) Notice: Subject to any disclaimer, the term of this patent is extended or adjusted under 35 U.S.C. 154(b) by 765 days.

(21) Appl. No.: 17/356,524

(22) Filed: Jun. 24, 2021

(65) Prior Publication Data
US 2021/0402617 A1    Dec. 30, 2021

(30) Foreign Application Priority Data
Jun. 29, 2020   (JP) ................................. 2020-111296

(51) Int. Cl.
B25J 15/00   (2006.01)
B23P 19/04   (2006.01)
B25B 27/24   (2006.01)
F01L 3/10    (2006.01)

(52) U.S. Cl.
CPC ............ B23P 19/045 (2013.01); B25B 27/24 (2013.01); B25J 15/0095 (2013.01); B25J 15/0038 (2013.01); F01L 3/10 (2013.01)

(58) Field of Classification Search
CPC . F01L 3/10; B23P 19/045; B25B 27/24; B25J 15/0095; Y10T 29/53552; Y10T 29/53557
See application file for complete search history.

(56) References Cited

U.S. PATENT DOCUMENTS 4,823,887 A * 4/1989 Umeda ............... B23B 31/4053
                                                    74/606 R
5,072,950 A * 12/1991 Littleproud ............... F01L 3/08
                                                    123/188.13
5,915,740 A *  6/1999 Weitner .................. B25B 27/24
                                                    29/213.1
2003/0200641 A1  10/2003 Tachibana et al.
2012/0285015 A1  11/2012 Shiga et al.

FOREIGN PATENT DOCUMENTS

| CN | 102777224 A | 11/2012 |
|---|---|---|
| JP | H1061420 A | 3/1998 |
| JP | 2003311557 A | 11/2003 |
| JP | 2011-58421 A | 3/2011 |
| JP | 2012-241519 A | 12/2012 |

* cited by examiner

*Primary Examiner* — Dean J Kramer
(74) *Attorney, Agent, or Firm* — HAUPTMAN HAM, LLP

(57) ABSTRACT

A retainer gripping device, configured to grip a retainer accommodating a set of cotters inside the retainer, includes a retainer gripping unit, a retainer supporting portion, and a cotter supporting portion. The retainer gripping unit is configured to grip the retainer. The retainer supporting portion is configured such that the retainer gripped by the retainer gripping unit is placed in a state in which the set of cotters are accommodated inside the retainer. The cotter supporting portion is configured to support lower end edge portions of the cotters accommodated inside the retainer in a state in which the lower end edge portions are lifted upward higher than a lower end edge portion of the retainer.

5 Claims, 10 Drawing Sheets

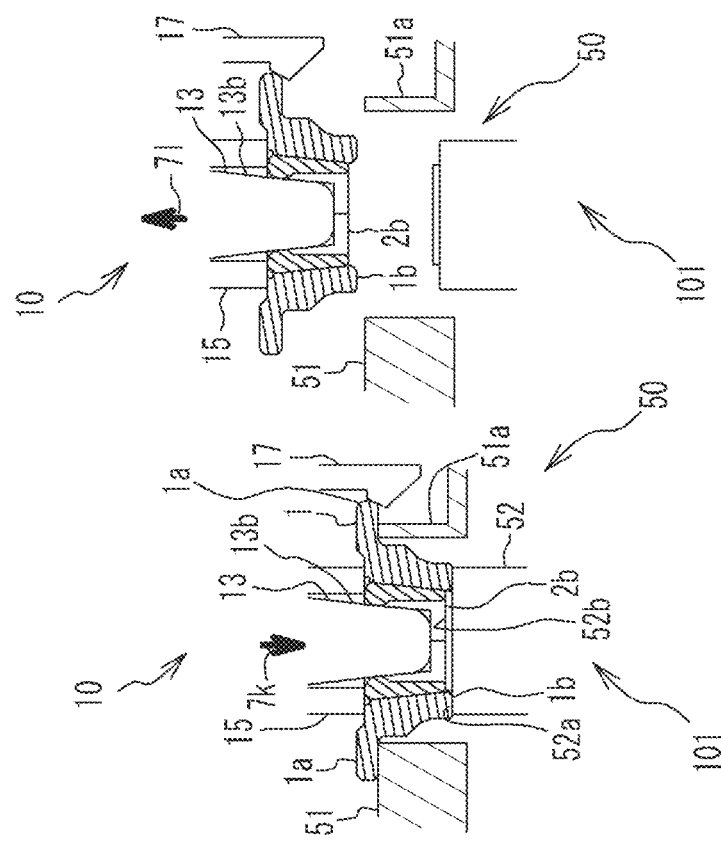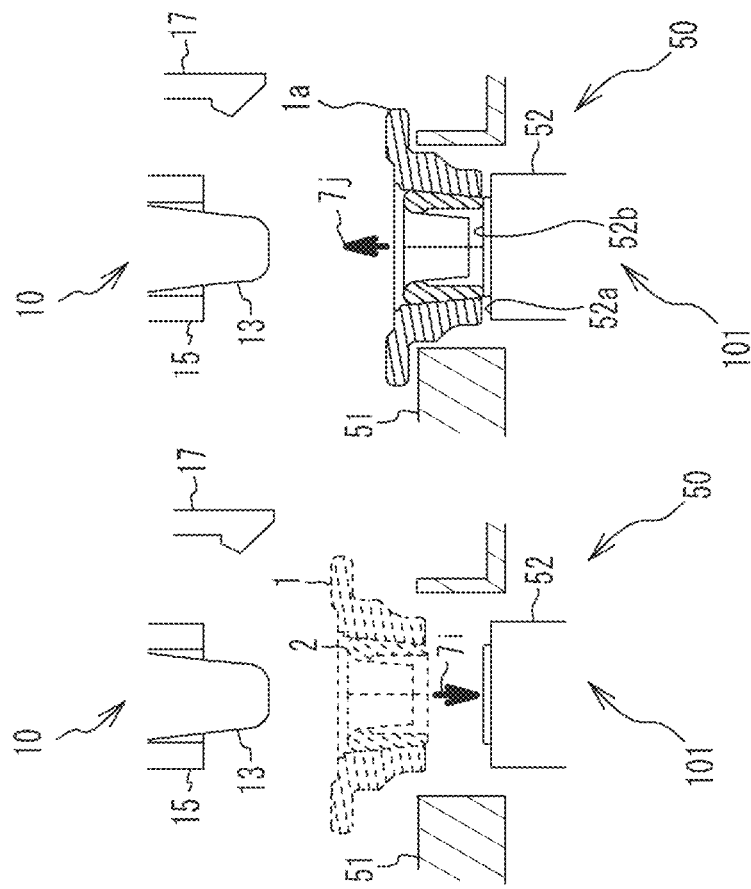

RETAINER GRIPPING DEVICE

CROSS-REFERENCE TO RELATED APPLICATION

This application claims priority to Japanese Patent Application No. 2020-111296 filed on Jun. 29, 2020, incorporated herein by reference in its entirety.

BACKGROUND

1. Technical Field

The present disclosure relates to a retainer gripping device.

2. Description of Related Art

There is known a valve spring assembling device that assembles valves for intake and exhaust of an internal combustion engine to a cylinder head along with valve springs (see Japanese Unexamined Patent Application Publication No. 10-61420 (JP 10-61420 A), for example). By using such a valve spring assembling device, a valve spring is clamped between a retainer mounted to an end portion of a valve stem and the cylinder head. The retainer has a conical form, and is used in a state with a set of cotters accommodated therein. The retainer accommodating the cotters therein is gripped by a retainer gripping device, and is conveyed to an area above the cylinder head in which the valve and the valve spring are placed. The retainer conveyed to the area above the cylinder head is mounted to the valve stem by being pressed toward the cylinder head side, and thus clamps the valve spring between itself and the cylinder head.

SUMMARY

Now, even when the cotters accommodated in the retainer meet product standards, there will be variations in the product dimensions thereof. The state of the cotters accommodated within the retainer may vary due to such variations in product dimensions. For example, when a lower end edge portion of a cotter protrudes too far from a lower end edge portion of the retainer accommodating the cotter, the valve stem may thrust the cotter upward at the time of pressing the retainer from above the valve to mount to the valve stem, leading to assembly defect. JP 10-61420 A does not take into consideration whatsoever the state of the cotters within the retainer conveyed to the area above the valve placed on the cylinder head, and accordingly does not eliminate assembly defects.

The present disclosure provides a retainer gripping device by which cotters in a gripped retainer are placed such that assembly defects of the retainer are suppressed.

A retainer gripping device according to an aspect of the present disclosure is a retainer gripping device configured to grip a retainer accommodating a set of cotters inside the retainer. The retainer gripping device includes a retainer gripping unit, a retainer supporting portion, and a cotter supporting portion. The retainer gripping unit is configured to grip the retainer. The retainer supporting portion is configured such that the retainer gripped by the retainer gripping unit is placed in a state in which the set of cotters are accommodated inside the retainer. The cotter supporting portion is configured to support lower end edge portions of the cotters accommodated inside the retainer in a state in which the lower end edge portions are lifted upward higher than a lower end edge portion of the retainer.

In the retainer gripping device according to the aspect of the present disclosure, the cotter supporting portion may be provided at an upper step from the retainer supporting portion provided around the cotter supporting portion.

Also, in the retainer gripping device according to the aspect of the present disclosure, the retainer gripping unit may include a plunging pin member inserted from above between the set of cotters supported by the cotter supporting portion. In the retainer gripping device according to the aspect of the present disclosure, the plunging pin member may include a tapered portion on a distal end portion of the plunging pin member. The tapered portion is reduced in diameter toward a distal end side of the plunging pin member. Further, in the retainer gripping device according to the aspect of the present disclosure, the retainer gripping unit may include a first biasing member that is configured to bias the plunging pin member toward a side of the cotter supporting portion.

Also, in the retainer gripping device according to the aspect of the present disclosure, the retainer gripping unit may include a cotter presser member disposed at a position facing the cotter supporting portion. In the retainer gripping device according to the aspect of the present disclosure, the retainer gripping unit may include a second biasing member that is configured to bias the cotter presser member toward a side of the cotter supporting portion.

According to the retainer gripping device of an aspect of the present disclosure, cotters in a gripped retainer can be placed in a state in which assembly defect of the retainer is suppressed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 10A is a process diagram illustrating a state in which the retainer and the cotters are gripped by the retainer gripping device according to the embodiment;

FIG. 10B is a process diagram illustrating a state in which the retainer and the cotters are gripped by the retainer gripping device according to the embodiment;

FIG. 10C is a process diagram illustrating a state in which the retainer and the cotters are gripped by the retainer gripping device according to the embodiment; and FIG. 10D is a process diagram illustrating a state in which the retainer and the cotters are gripped by the retainer gripping device according to the embodiment.

DETAILED DESCRIPTION OF EMBODIMENTS

Figure 1:
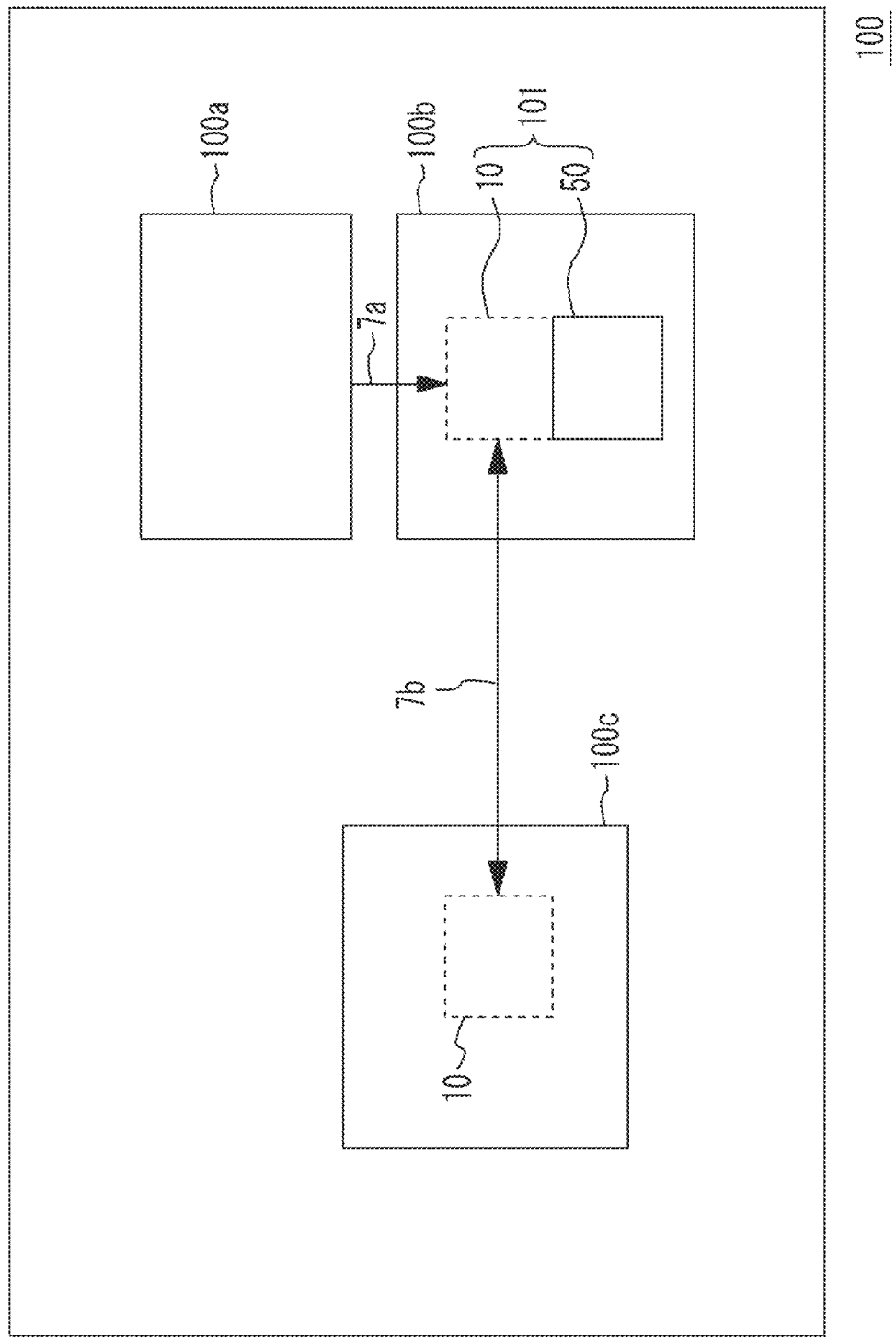
FIG. 1 is an explanatory diagram illustrating a schematic configuration of a valve assembling device.

An embodiment of the present disclosure will be described below with reference to the attached drawings. Note, however, that the dimensions, proportions, and so forth, of the parts in the drawings are not necessarily illustrated to completely match the actual articles. Also, some drawings may be drawn with details omitted.

Embodiment

A schematic configuration of a valve assembling device 100 including a retainer gripping device 101 according to the embodiment will be described first with reference to FIGS. 1, 2, 3A and 3B. The valve assembling device 100 includes a retainer supply unit 100a, a retainer gripping stand 100b, and a valve assembling stand 100c, as illustrated in FIG. 1. A seat portion 50 included in the retainer gripping device 101 is provided to the retainer gripping stand 100b. A retainer gripping unit 10 included in the retainer gripping device 101 is capable of moving between a position facing the seat portion 50, and the valve assembling stand 100c, as indicated by arrow 7b.

Figure 2:
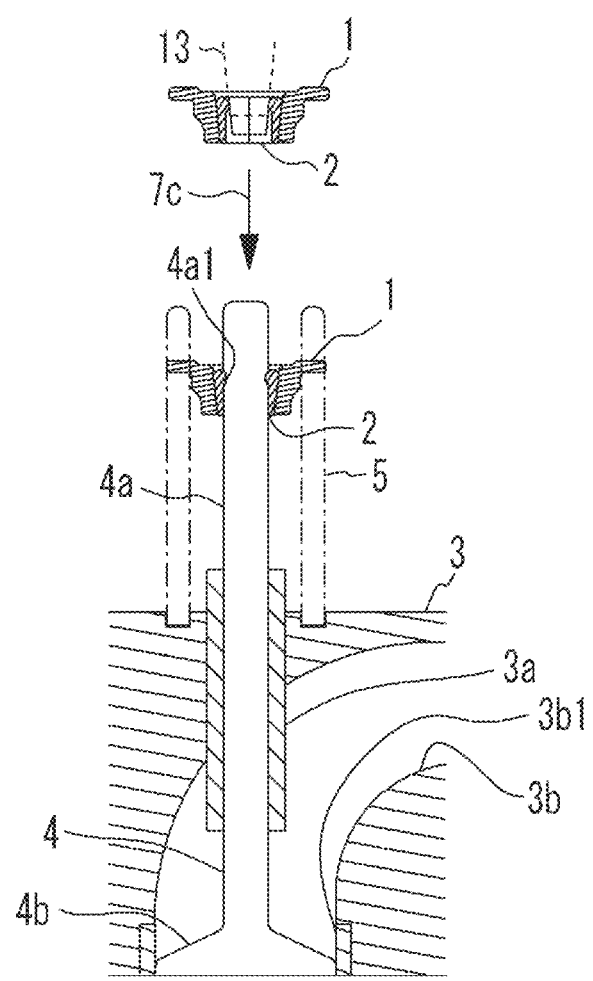
FIG. 2 is an explanatory diagram schematically illustrating a state in which a retainer is mounted on a valve stem of a valve placed on a cylinder head on a valve assembling stand.

The valve assembling device 100 mounts a retainer 1 to a valve stem 4a of a valve 4 via cotters 2, as illustrated in FIG. 2. Mounting of such a retainer 1 is performed on the valve assembling stand 100c. A cylinder head 3 with the valve 4 and a valve spring 5 placed thereon is conveyed to the valve assembling stand 100c, and is placed. The valve 4 is placed such that the valve stem 4a passes through a valve guide 3a provided to the cylinder head 3, and a valve head 4b is in contact with a valve seat 3b1 provided to a port 3b. The retainer 1 is pressed toward the valve 4 as indicated by arrow 7c, and is mounted to the valve stem 4a. The retainer 1 mounted to the valve stem 4a clamps the valve spring 5 between itself and the cylinder head 3, thereby completing assembly of the valve 4 and the valve spring 5. Note that reference sign 13 in FIG. 2 denotes a plunging pin member 13 provided to the retainer gripping unit 10. The plunging pin member 13 is a member that is inserted into the cotters 2 when the retainer gripping unit 10 grips the retainer 1. The plunging pin member 13 will be described in detail later.

Figure 3A:
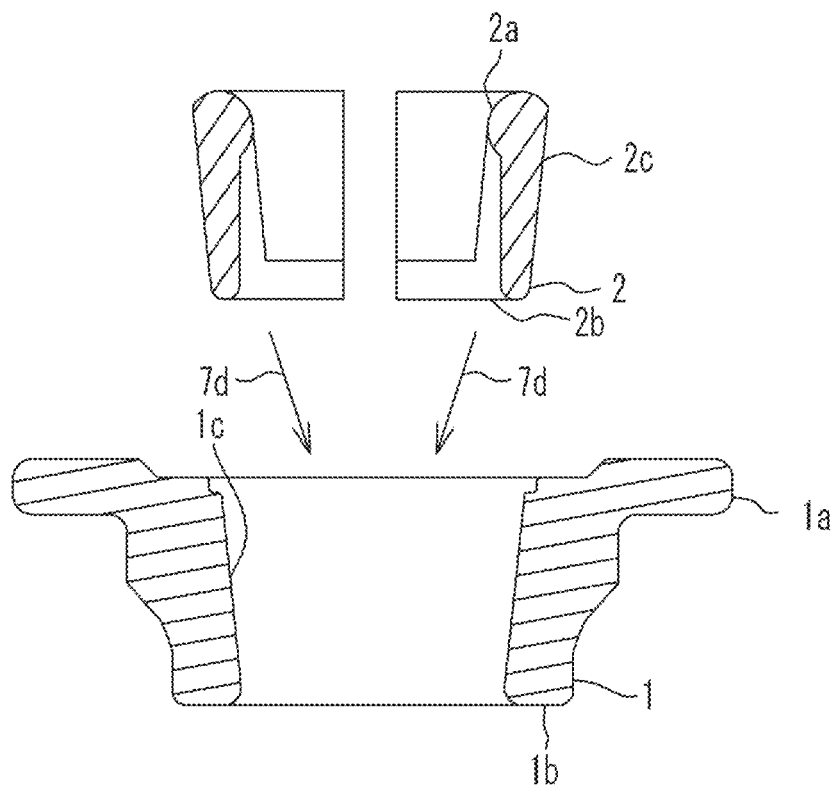
FIG. 3A is a cross-sectional view of the retainer and a set of cotters accommodated in the retainer.
Figure 3B:
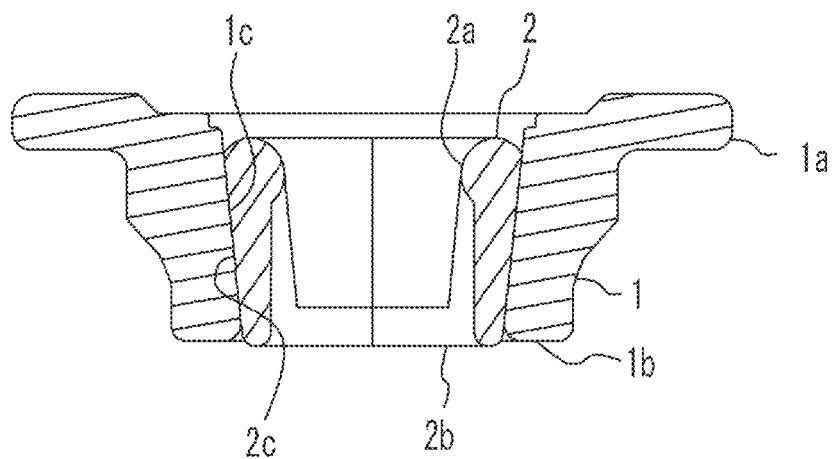
FIG. 3B is a cross-sectional view of the retainer in which the set of cotters is accommodated.

With reference to FIG. 3A, the retainer 1 is provided with a flanged spring seat 1a on the upper end portion thereof. An inner circumferential face 1c of the retainer 1 is a tapered face with the diameter decreasing from an upper end side toward a lower end edge portion 1b. A set of cotters 2 is accommodated within the retainer 1, as indicated by arrows 7d. The cotters 2 are two halves that are separable from each other. A protruding portion 2a protruding inward from the inner circumferential face of the cotters 2 is provided circularly in the vicinity of the upper end thereof. An outer circumferential face 2c of the cotters 2 is a tapered face with the diameter decreasing from an upper end side toward lower end edge portions 2b. The cotters 2 is accommodated within the retainer 1 in a state in which the outer circumferential face 2c is in contact with the inner circumferential face 1c of the retainer 1, as illustrated in FIG. 3B. The protruding portion 2a fits into a groove portion 4a1 provided to the valve stem 4a, as illustrated in FIG. 2.

As illustrated in FIG. 3B, the retainer 1 that accommodates a set of cotters 2 is sequentially supplied from the retainer supply unit 100a to the retainer gripping stand 100b, as indicated by arrow 7a in FIG. 1. At the retainer gripping stand 100b, the retainer gripping device 101 grips the retainer 1 supplied from the retainer supply unit 100a along with the cotters 2.

Figure 4:
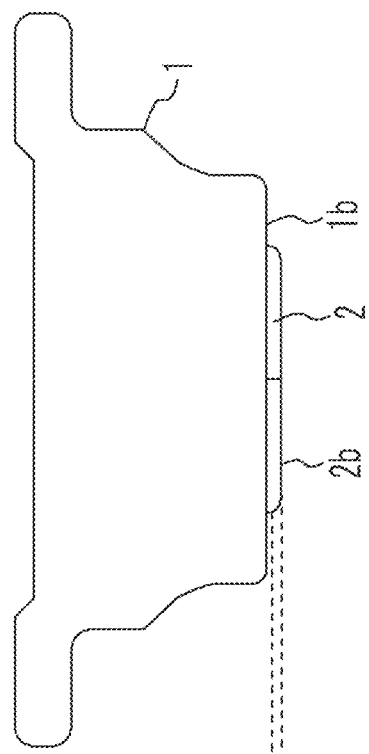
FIG. 4 is an explanatory diagram illustrating a positional relation between a lower end edge portion of the retainer and lower end edge portions of the cotters.
Figure 4:
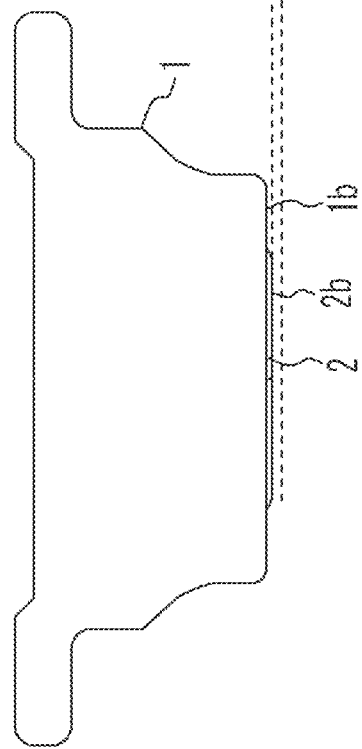

Now, a state of the cotters 2 accommodated in the retainer 1 will be described with reference to (A) in FIG. 4 and (B) in FIG. 4. Comparing the retainer 1 and the cotters 2 illustrated in (A) in FIG. 4 with the retainer 1 and the cotters 2 illustrated in (B) in FIG. 4, the amounts of protrusion of the lower end edge portions 2b of the cotters 2 from the lower end edge portions 1b of the retainers 1 differ from each other. The cotters 2 illustrated in (A) in FIG. 4 and the cotters 2 illustrated in (B) in FIG. 4 have both passed product standards, and can be employed as products. However, there is dimensional variation, which is within the tolerance range, between the two, and accordingly the states of the cotters 2 when accommodated in the respective retainers 1 differ. Comparing the state illustrated in (A) in FIG. 4 with the state illustrated in (B) in FIG. 4, the lower end edge portions 2b of the cotters 2 protrude farther in the state illustrated in (B) in FIG. 4, and there is a difference of distance d between the protrusion amounts. Both the inner circumferential face 1c of the retainer 1 and the outer circumferential face 2c of the cotters 2 have tapered faces, and accordingly, when the lower end edge portions 2b of the cotters 2 are located lower by the distance d as illustrated in (B) in FIG. 4, this means that the inner circumferential diameter of the cotters 2 is smaller in accordance with the amount displaced downwards.

Figure 5:
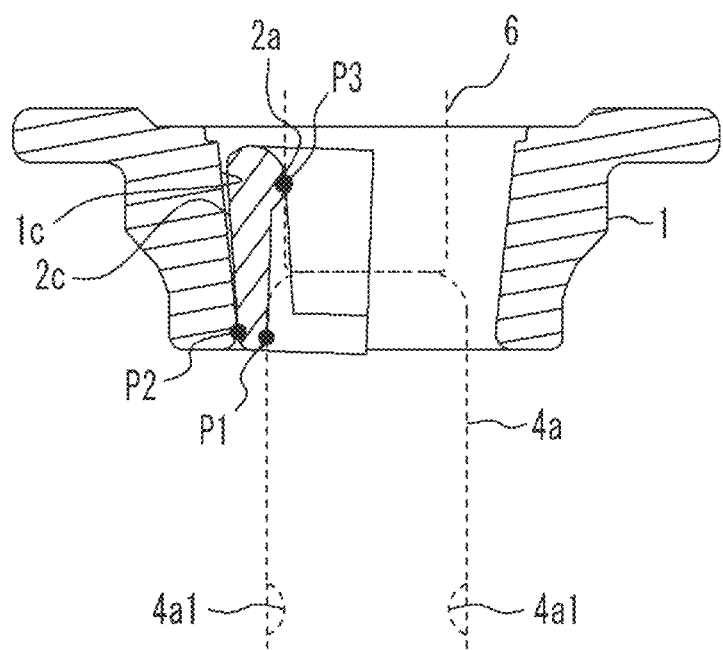
FIG. 5 is an explanatory diagram schematically illustrating a state of the cotters when the retainer is assembled using a device according to a comparative example, and assembly defect of the retainer occurs.

When mounting of the retainer 1 to the valve stem 4a is attempted without taking any measures regarding the situation in which the states of the cotters 2 within the retainer 1 are different as described above, there is a possibility that the valve stem 4a will thrust the cotters 2 upward, and assembly defect will occur. The retainer gripping device 101 according to the present embodiment has been made to avoid such assembly defects. In order to facilitate understating of the operations of the retainer gripping device 101, a reason of assembly defects, to be solved by the retainer gripping device 101, occurring will be described with reference to FIG. 5. FIG. 5 schematically illustrates a state of the cotters 2 when the retainer 1 is assembled using a device according to a comparative example in which measures for avoiding assembly defects have not been implemented, and assembly defects of the retainer 1 occur. The device according to the comparative example is provided with a plunging pin member 6 instead of the plunging pin member 13 that the retainer gripping device 101 according to the embodiment is provided with. The plunging pin member 6 is a rod-shaped member that is substantially uniform in diameter to a distal end portion. Note that only one cotter 2 of the set of cotters 2 is illustrated in FIG. 5, for the sake of convenience in description.

The retainer 1 accommodating the cotters 2 therein is gripped in a state in which the plunging pin member 6 is inserted into the cotters 2, and is pressed onto the valve stem 4a in this state. When the lower end edge portions 2b of the cotters 2 are protruding too far beyond the lower end edge portion 1b of the retainer 1 as illustrated in (B) in FIG. 4, for example, the valve stem 4a collides with a first contact point P1 on the inner circumference of the cotters 2, as illustrated in FIG. 5. The cotters 2 accordingly are thrusted upward in an inclined state, and a second contact point P2 on the outer circumferential face 2c comes into contact with the inner circumferential face 1c of the retainer 1. Also, a third contact point P3 on the protruding portions 2a of the cotters 2 comes into contact with and presses against the plunging pin member 6. Such contact of the parts can occur at the other cotter 2 of the set of cotters 2. When the cotters 2 come into contact with these parts, the cotters 2 become jammed within the retainer 1 and thus are locked up. The valve stem 4a is then no longer able to enter into the cotters 2, resulting in assembly defects.

Next, the retainer gripping device 101 that is able to avoid such assembly defects will be described with reference to FIGS. 6A through 9.

Figure 6A:
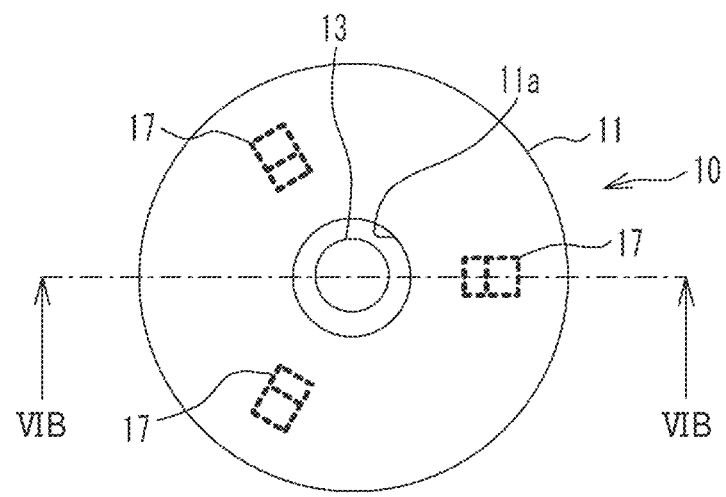
FIG. 6A is a planar view of a retainer gripping unit according to an embodiment.
Figure 6B:
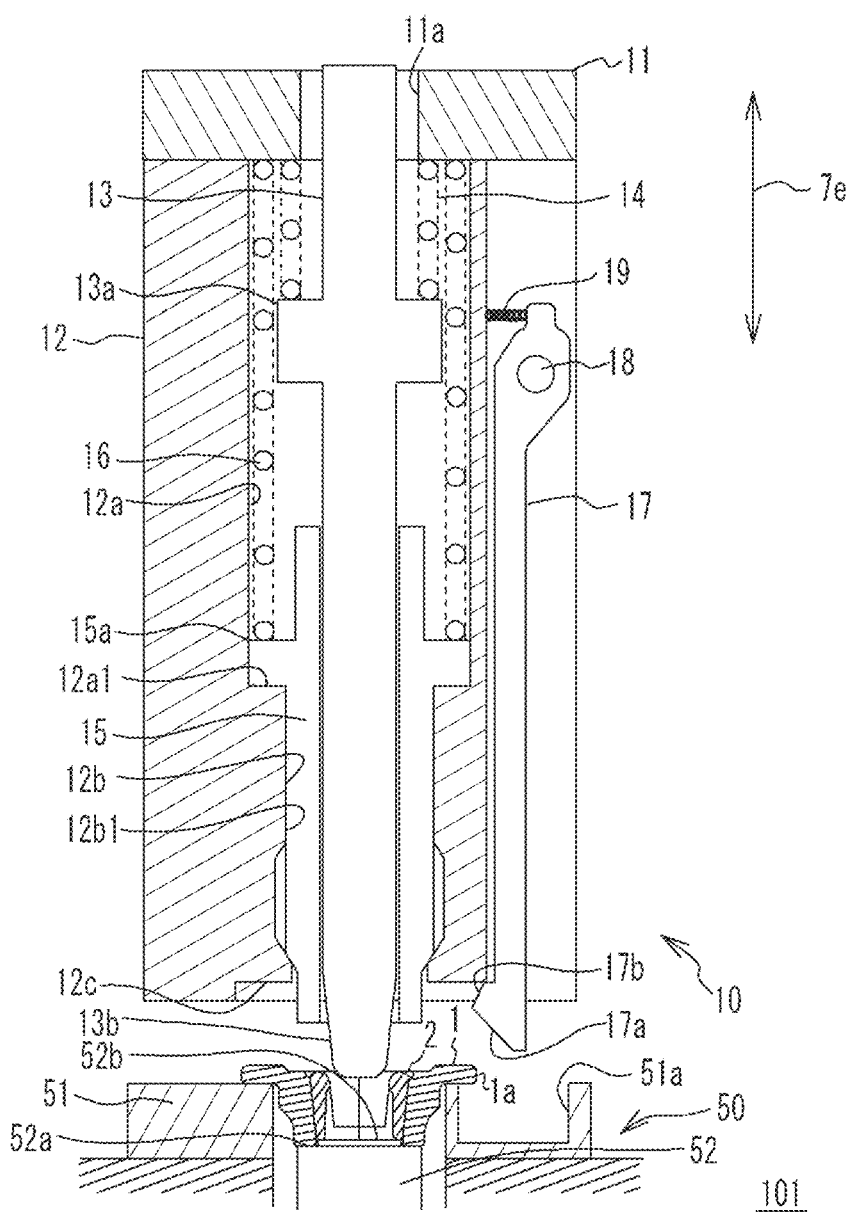
FIG. 6B is a sectional view of the retainer gripping device according to the embodiment, taken along line VIB-VIB in FIG. 6A.

With reference to FIGS. 6A and 6B, the retainer gripping device 101 is provided with the retainer gripping unit 10 and the seat portion 50. The retainer gripping unit 10 is able to ascend/descend in the up-down direction, as indicated by arrow 7e, and also is able to move laterally. Thus, the retainer gripping unit 10 is able to move between the position facing the seat portion 50, and the valve assembling stand 100c (see FIG. 1).

The retainer gripping unit 10 is provided with a base member 11, a supporting member 12, the plunging pin member 13, a cotter presser member 15, and three claw members 17.

The base member 11 is a disc-shaped member, and has an opening portion 11a at the center portion thereof. The upper end portion of the plunging pin member 13 passes through the opening portion 11a.

The supporting member 12 is a cylindrical member, and is provided on the lower side of the base member 11. The supporting member 12 has a large-diameter portion 12a on the side closer to the base member 11 in the interior thereof. The supporting member 12 also has a small-diameter portion 12b on the lower side of the large-diameter portion 12a, with a stepped portion 12a1 formed between the large-diameter portion 12a and the small-diameter portion 12b. Also, an accommodation portion 12c that accommodates the spring seat 1a of the retainer 1 is provided on the end face of the supporting member 12 on the distal end side (lower end side).

The plunging pin member 13 and the cotter presser member 15 are supported slidably within the supporting member 12. The plunging pin member 13 is a rod-shaped member that has a flange portion 13a on the base side closer to the base member 11. A first spring member 14 is clamped between the flange portion 13a and the base member 11, to serve as a first biasing member. The plunging pin member 13 is biased by the first spring member 14 toward the distal end side, i.e., toward the seat portion 50 that the retainer gripping unit 10 faces. The plunging pin member 13 is provided with a tapered portion 13b at the distal end portion of which the diameter is reduced toward the distal end side.

The cotter presser member 15 is a cylindrical member, with the plunging pin member 13 slidably inserted in the interior thereof. The cotter presser member 15 is provided with a flange portion 15a on the outer circumferential face thereof, and is placed inside the supporting member 12 with the flange portion 15a engaging the stepped portion 12a1. Also, a second spring member 16 is clamped between the flange portion 15a and the base member 11, to serve as a second biasing member. The cotter presser member 15 is biased by the second spring member 16 toward the distal end side, i.e., toward the side of the seat portion 50 that the retainer gripping unit 10 faces. A distal end face of the cotter presser member 15 comes into contact with the upper end edge of the cotters 2, and is capable of coming into contact with the retainer 1.

The three claw members 17 are circularly and equidistantly disposed around the plunging pin member 13 and the cotter presser member 15. Note that only one claw member 17 is illustrated in FIG. 6B, for the sake of convenience in description. The claw members 17 are disposed in recessed portions provided on the outer circumferential wall of the supporting member 12. Each claw member 17 is pivotably supported by a pivotably-supporting member 18 so as to be capable of opening and closing. A third spring member 19 is disposed above the pivotably-supporting member 18 of the claw member 17. The third spring member 19 biases the distal end side (lower end side) of the claw member 17 in the closing direction. A first tapered face 17a and a second tapered face 17b are provided on the distal end side of the claw member 17. The first tapered face 17a and the second tapered face 17b are both disposed on the inward side in the state of the claw members 17 being circularly arrayed, with the first tapered face 17a being located at the bottommost side, and the second tapered face 17b being located above the first tapered face 17a. The first tapered face 17a is inclined toward the outer side of the supporting member 12 in a direction from an upper side toward a lower side, and the second tapered face 17b is inclined toward the inner side of the supporting member 12 in the direction from the upper side toward the lower side.

When the retainer gripping unit 10 descends and grips the retainer 1, the first tapered face 17a comes into contact with the spring seat 1a, thereby compressing the third spring member 19, and the claw member 17 transitions to the open state. After the first tapered face 17a passes the spring seat 1a, the claw member 17 transitions to a closed state under the elastic force of the third spring member 19, and thereby grips the retainer 1. At this time, the second tapered face 17b is in contact with the spring seat 1a. On the other hand, when the retainer gripping unit 10 rises and releases the retainer 1, the third spring member 19 is compressed due to the second tapered face 17b being in contact with the spring seat 1a, and the claw member 17 transitions to the open state. After the second tapered face 17b passes the spring seat 1a, the claw member 17 returns to the closed state under the elastic force of the third spring member 19.

The seat portion 50 includes a first base block 51 and a second base block 52. The second base block 52 is placed on the inner side of the first base block 51, which has an annular form in planar view. The first base block 51 supports the spring seat 1a of the retainer 1. The first base block 51 has claw-tip accommodating portions 51a, so that descending claw members 17 do not come into contact with the first base block 51.

The second base block 52 includes a retainer supporting portion 52a that supports the lower end edge portion 1b of the retainer 1, and a cotter supporting portion 52b that is provided on the inner side of the retainer supporting portion 52a, and that supports the lower end edge portions 2b of the cotters 2.

Figure 7:
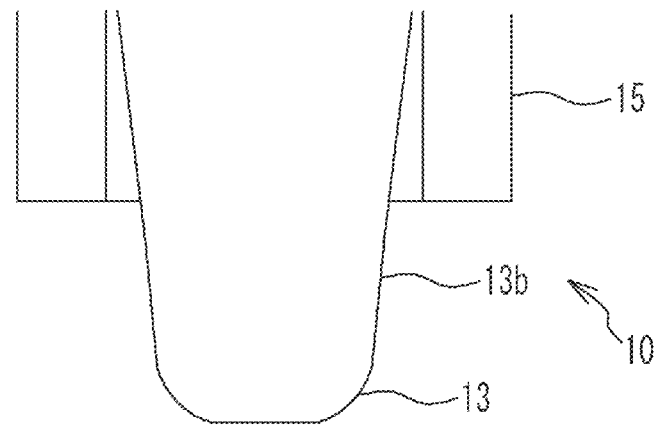
FIG. 7 is an enlarged explanatory diagram illustrating the vicinity of a seat portion of the retainer gripping device according to the embodiment.
Figure 7:
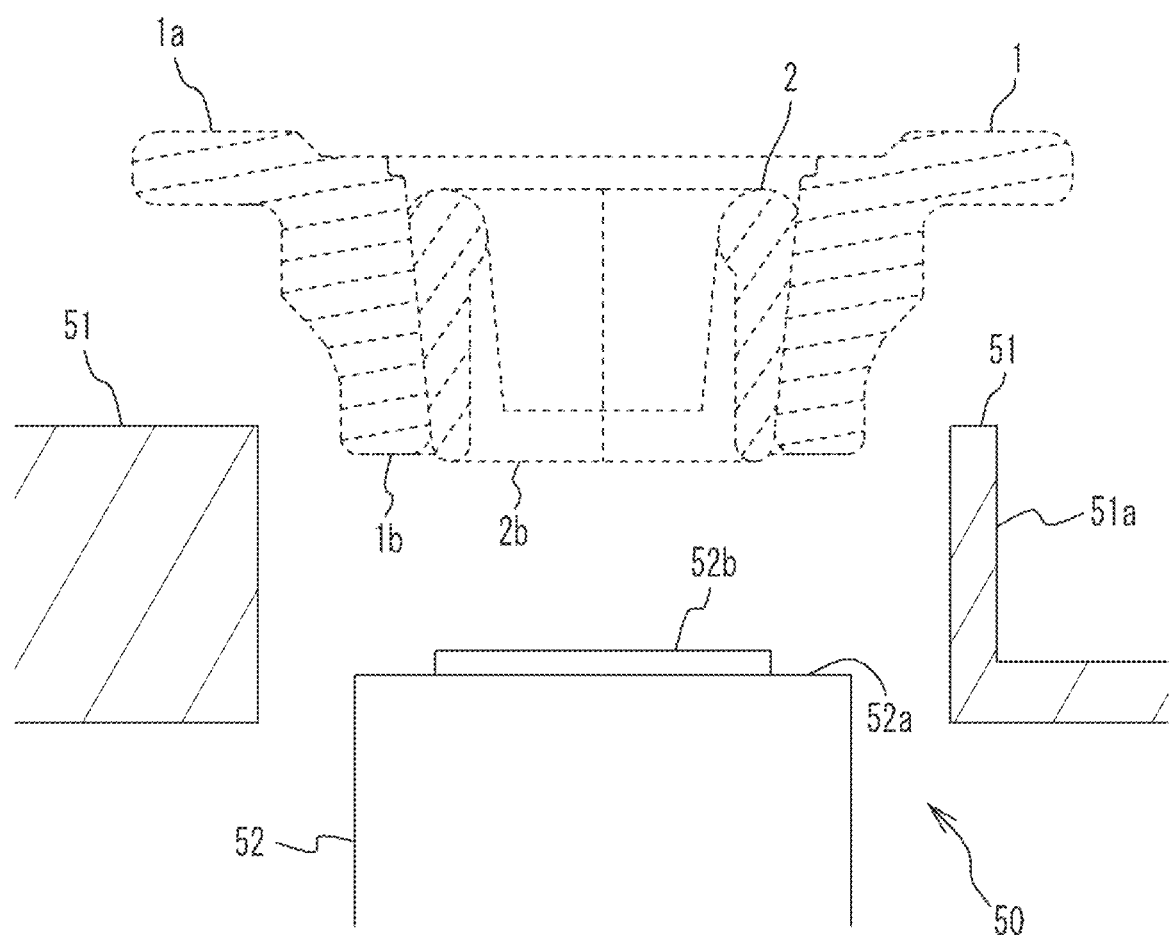

It will be clearly understood from FIG. 7 that there is a level difference between the cotter supporting portion 52b and the retainer supporting portion 52a around the cotter supporting portion 52b, and is provided at a higher position than the retainer supporting portion 52a. The cotter supporting portion 52b supports the lower end edge portions 2b of the cotters 2 accommodated within the retainer 1 in a state in which the lower end edge portions 2b of the cotters 2 are lifted upward higher than the lower end edge portion 1b of the retainer 1. Note that the claw members 17 are omitted from illustration in FIG. 7.

The present embodiment is provided with the first base block 51 and the retainer supporting portion 52a, both of which support the retainer 1. Since both the first base block 51 and the retainer supporting portion 52a are provided, the retainer 1 can be placed on the seat portion 50 in a stable manner. Note however, when the first base block 51 is provided, the first base block 51 may be made to function as a retainer supporting portion, and the retainer supporting portion 52a may be omitted to simplify the device. Even when the retainer supporting portion 52a is omitted, the cotter supporting portion 52b can support the lower end edge portions 2b of the cotters 2 accommodated within the retainer 1 in a state in which the lower end edge portions 2b of the cotters 2 are lifted upward higher than the lower end edge portion 1b of the retainer 1.

Figure 8:
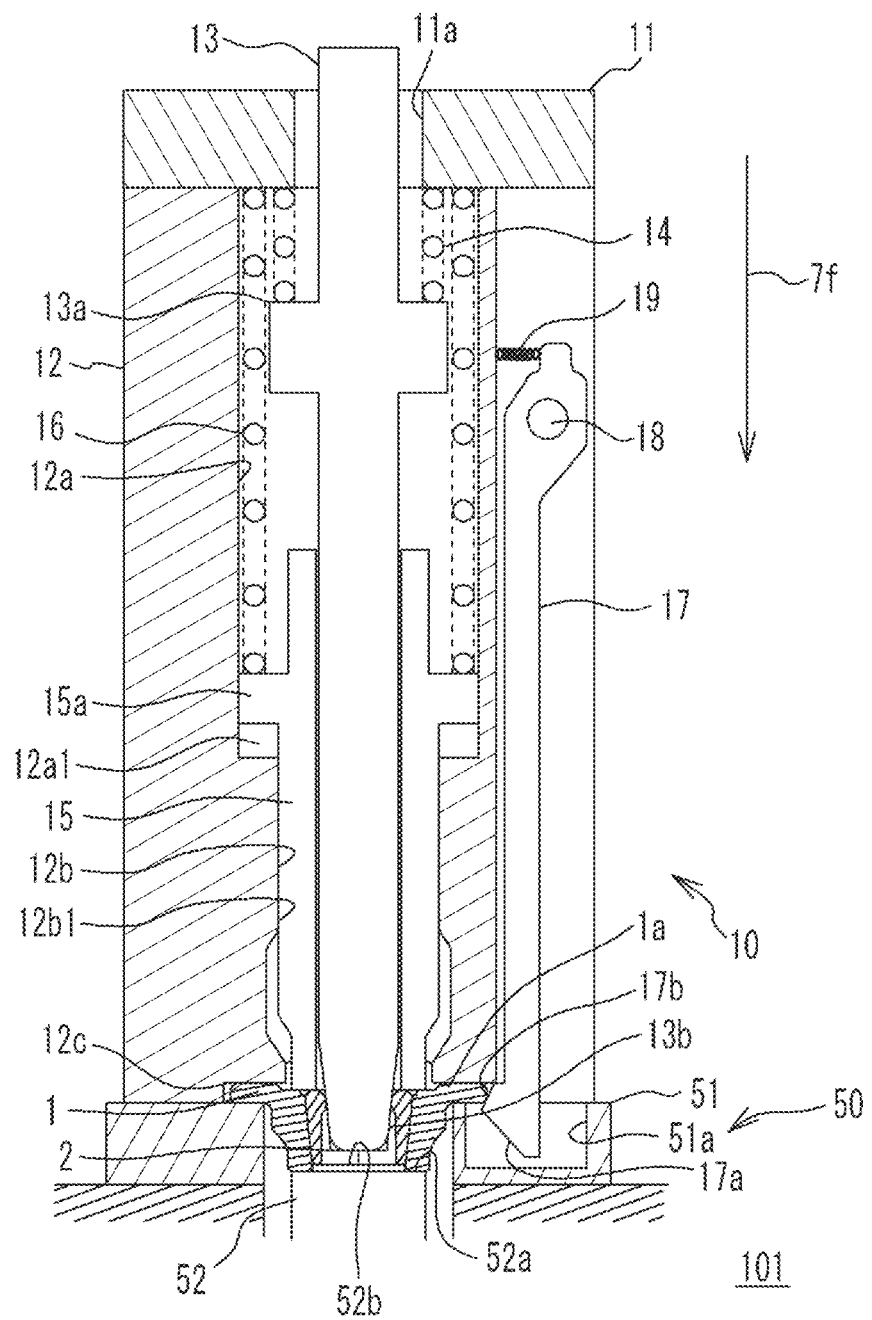
FIG. 8 is a sectional view illustrating a state in which the retainer and the cotters are gripped by the retainer gripping device according to the embodiment.
Figure 9:
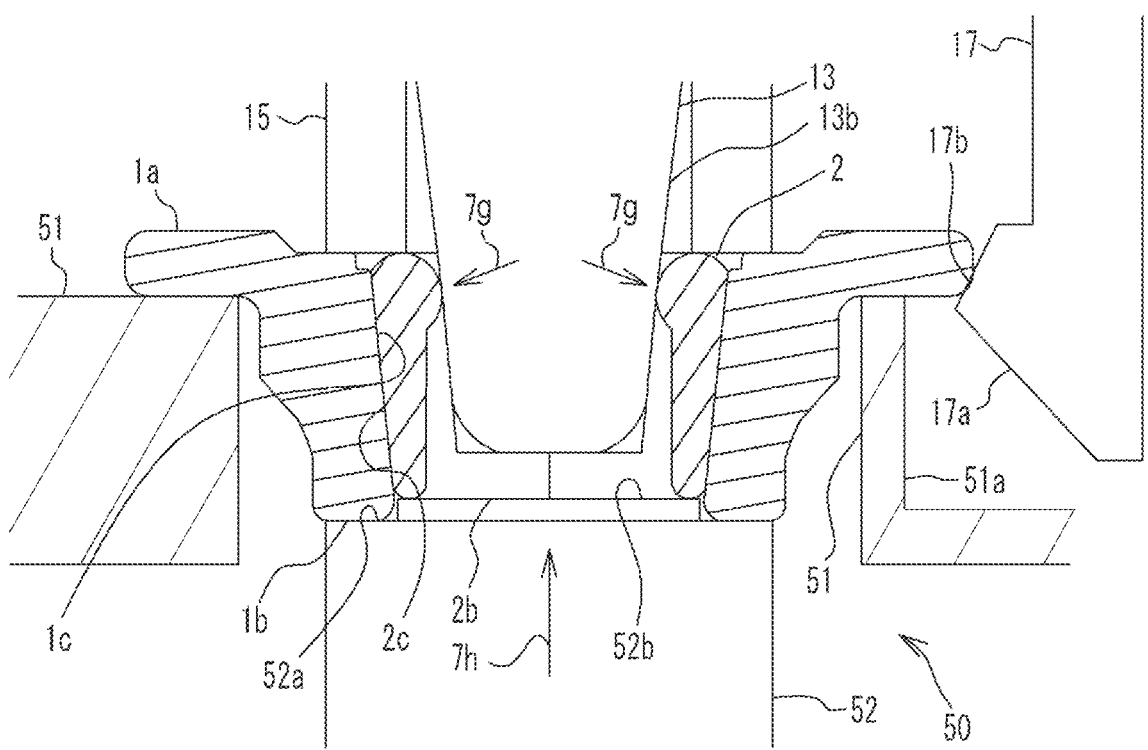
FIG. 9 is an enlarged explanatory diagram illustrating the vicinity of the seat portion when gripping the retainer and the cotters by the retainer gripping device according to the embodiment.

The retainer gripping device 101 uses the retainer gripping unit 10 to grip the retainer 1 and the cotters 2 supplied to the seat portion 50, as illustrated enlarged in FIGS. 8 and 9.

The cotters 2 placed on the seat portion 50 are lifted upwards by the lower end edge portions 2b coming into contact with the cotter supporting portion 52b, as indicated by arrow 7h in FIG. 9. Accordingly, the lower end edge portions 2b of the cotters 2 are in a state of being positioned higher than the lower end edge portion 1b of the retainer 1. Accordingly, even when the lower end edge portions 2b excessively protrude beyond the lower end edge portion 1b of the retainer 1 due to dimensional variations of the cotters 2, as illustrated in (B) in FIG. 4, for example, occurrence of the phenomenon illustrated in FIG. 5 is avoided. As a result, assembly defects of the retainer 1 are avoided.

In the present embodiment, when the retainer gripping unit 10 grips the retainer 1 and the cotters 2, the retainer gripping unit 10 descends toward the seat portion 50, as indicated by arrow 7f in FIG. 8. Accordingly, the plunging pin member 13 is inserted into the cotters 2, and widens the set of cotters 2 by pressing, as indicated by arrow 7g in FIG. 9. The outer circumferential face 2c of the cotters 2 is pressed against the inner circumferential face 1c of the retainer 1, and accordingly the positional relation between the retainer 1 and the cotters 2 is maintained.

Even when the plunging pin member 13 is not provided, the positional relation between the cotters 2 and the retainer 1 is improved by the cotters 2 being placed on the cotter supporting portion 52b. Avoiding assembly defects can be anticipated due to the claw members 17 gripping the retainer 1 in a state in which the positional relation between the cotters 2 and the retainer 1 is improved. Note however, that a situation can be conceived in which the lower end edge portions 2b of the cotters 2 come to excessively protrude from the lower end edge portion 1b of the retainer 1 during the process of the retainer gripping unit 10 gripping and conveying the retainer 1 and the cotters 2. In the present embodiment, the retainer 1 and the cotters 2 can be conveyed while maintaining the improved positional relation between the retainer 1 and the cotters 2 by being provided with the plunging pin member 13. In particular, the plunging pin member 13 of the present embodiment is provided with the tapered portion 13b at the distal end portion thereof, and the tapered portion 13b is inserted into the cotters 2, thereby gradually spreading the set of cotters 2 by pressing, and the state of the cotters 2 can be maintained stably.

Also, according to the present embodiment, the plunging pin member 13 is biased toward the cotter supporting portion 52b side, i.e., toward the distal end side, by the first spring member 14, and accordingly the state of the cotters 2 can be maintained stably.

Further, according to the present embodiment, the cotter presser member 15 is biased toward the cotter supporting portion 52b side, i.e., toward the distal end side, by the second spring member 16, and accordingly the state of the cotters 2 can be maintained stably. Also, the distal end face of the cotter presser member 15 comes into contact with the upper end edge of the cotters 2, and also can come into contact with the retainer 1, and accordingly, the relation of the upper end positions between the upper end edge of the cotters 2 and the retainer 1 can be maintained. Also, the cotter presser member 15 is biased by the second spring member 16, and accordingly the relation of the upper end positions between the upper end edge of the cotters 2 and the retainer 1 can be maintained stably.

Next, the series of processes of the retainer gripping device 101 gripping the retainer 1 will be described with reference to FIGS. 10A through 10D.

First, as illustrated in FIG. 10A, the retainer 1 accommodating the set of cotters 2 therein is supplied to the seat portion 50, as indicated by the arrow 7i. At this time, the lower end edge portions 2b of the cotters 2 come into contact with the cotter supporting portion 52b prior to the lower end edge portion 1b of the retainer 1 coming into contact with the retainer supporting portion 52a, as illustrated in FIG. 10B. Accordingly, the cotters 2 are raised as indicated by arrow 7j, and the lower end edge portions 2b of the cotters 2 are in a state of being lifted upward higher than the lower end edge portion 1b of the retainer 1, as illustrated in FIG. 10C. Then, in FIG. 10C, the retainer gripping unit 10 descends toward the seat portion 50 as indicated by arrow 7k. Accordingly, the plunging pin member 13 is inserted into the cotters 2, and the set of cotters 2 are spread by pressing, and are pressed against the retainer 1. The claw members 17 are also hooked onto the spring seat 1a, thereby gripping the retainer 1. The retainer gripping unit 10 gripping the retainer 1 rises as indicated by arrow 7l in FIG. 10D, and moves to the valve assembling stand 100c (see FIG. 1). At the valve assembling stand 100c, the retainer 1 is mounted onto the valve stem 4a so as to clamp the valve spring 5 between the retainer 1 and the cylinder head 3, as illustrated in FIG. 2.

The above embodiment is only an example for carrying out the present disclosure, and the applicable embodiment is not limited thereto. Various modifications of the embodiment are encompassed by the scope of the present disclosure, and it is self-evident from the above description that various embodiments are further possible within the scope of the present disclosure.

What is claimed is:
1. A retainer gripping device configured to grip a retainer accommodating a set of cotters inside the retainer, the retainer gripping device comprising:
a retainer gripping unit configured to grip the retainer;

a retainer supporting portion configured such that the retainer gripped by the retainer gripping unit is placed in a state in which the set of cotters are accommodated inside the retainer; and a cotter supporting portion configured to support lower end edge portions of the cotters accommodated inside the retainer in a state in which the lower end edge portions are lifted upward higher than a lower end edge portion of the retainer, wherein the retainer gripping unit includes a plunging pin member inserted from above between the set of cotters supported by the cotter supporting portion, and the plunging pin member includes a tapered portion on a distal end portion of the plunging pin member, the tapered portion being reduced in diameter toward a distal end side of the plunging pin member.

2. The retainer gripping device according to claim 1, wherein the retainer gripping unit includes a first biasing member that is configured to bias the plunging pin member toward a side of the cotter supporting portion.

3. The retainer gripping device according to claim 1, wherein the retainer gripping unit includes a cotter presser member disposed at a position facing the cotter supporting portion.

4. The retainer gripping device according to claim 3, wherein the retainer gripping unit includes a second biasing member that is configured to bias the cotter presser member toward a side of the cotter supporting portion.

5. A retainer gripping device configured to grip a retainer accommodating a set of cotters inside the retainer, the retainer gripping device comprising:

a retainer gripping unit configured to grip the retainer;

a retainer supporting portion configured such that the retainer gripped by the retainer gripping unit is placed in a state in which the set of cotters are accommodated inside the retainer; and a cotter supporting portion configured to support lower end edge portions of the cotters accommodated inside the retainer in a state in which the lower end edge portions are lifted upward higher than a lower end edge portion of the retainer, wherein the cotter supporting portion is provided at an upper step from the retainer supporting portion provided around the cotter supporting portion.

* * * * *